US012703218B2

(12) United States Patent
Thompson et al.

(10) Patent No.: US 12,703,218 B2
(45) Date of Patent: Aug. 11, 2026

(54) SUSPENSION SYSTEM WITH ON-DEMAND FULL DAMPER CAPACITY

(71) Applicant: Ford Global Technologies, LLC, Dearborn, MI (US)

(72) Inventors: Steven Thompson, Royal Oak, MI (US); Tom Sawarynski, Dearborn, MI (US); Adam Busack, Dearborn, MI (US); Jason Michener, Novi, MI (US); Matthew Titus, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 18/788,870

(22) Filed: Jul. 30, 2024

(65) Prior Publication Data

US 2024/0383299 A1 Nov. 21, 2024

Related U.S. Application Data

(63) Continuation of application No. 17/579,791, filed on Jan. 20, 2022, now Pat. No. 12,065,008.

(51) Int. Cl.

*B60G 17/018* (2006.01)
*B60G 17/016* (2006.01)
(Continued)

(52) U.S. Cl.

CPC ....... *B60G 17/018* (2013.01); *B60G 17/0162* (2013.01); *B60G 17/0165* (2013.01);
(Continued)

(58) Field of Classification Search

CPC .............. B60G 17/018; B60G 17/0162; B60G 17/0165; B60G 2400/102; B60G 2400/204; B60G 2400/252; B60G 2400/41; B60G 2500/10; B60G 2800/94; B60G 17/016; B60G 17/0164; B60G 17/0195;
(Continued)

(56) References Cited

U.S. PATENT DOCUMENTS 4,647,069 A * 3/1987 Iijima ..................... F16F 9/468 280/DIG. 1
5,350,187 A * 9/1994 Shinozaki .......... B60G 17/0195 188/282.4
(Continued)

FOREIGN PATENT DOCUMENTS

CN 112776793 A 5/2021
CN 111873964 B 10/2021
(Continued)

*Primary Examiner* — Lindsay M Low
*Assistant Examiner* — Brian R Kirby
(74) *Attorney, Agent, or Firm* — Burr & Forman; Lorne Forsythe

(57) ABSTRACT

A suspension control system for a vehicle may include a plurality of adjustable dampers associated with suspension of respective ones of a plurality of wheels of the vehicle, a controller operably coupled to the adjustable dampers to selectively adjust a damping force of one or more of the adjustable dampers responsive to an activation signal, and a driver interface disposed at a steering wheel assembly of the vehicle. The driver interface may be actuated by a driver of the vehicle to apply the activation signal while the driver interface is actuated.

20 Claims, 6 Drawing Sheets

(51) Int. Cl.

| | |
|---|---|
| ***B60G 17/0165*** | (2006.01) |
| ***B60W 10/06*** | (2006.01) |
| ***B60W 10/184*** | (2012.01) |
| ***B60W 10/22*** | (2006.01) |
| ***B60W 30/02*** | (2012.01) |

(52) U.S. Cl.

CPC ............ *B60W 10/22* (2013.01); *B60W 30/02* (2013.01); *B60G 2400/102* (2013.01); *B60G 2400/204* (2013.01); *B60G 2400/252* (2013.01); *B60G 2400/41* (2013.01); *B60G 2500/10* (2013.01); *B60G 2800/94* (2013.01); *B60W 10/06* (2013.01); *B60W 10/184* (2013.01)

(58) Field of Classification Search

CPC .... B60G 17/06; B60G 17/08; B60G 2600/20; B60W 10/22; B60W 30/02

See application file for complete search history.

(56) References Cited

U.S. PATENT DOCUMENTS

| | | | | |
|---|---|---|---|---|
| 6,078,252 | A * | 6/2000 | Kulczycki | B60R 16/0315 340/475 |
| 10,471,962 | B2 * | 11/2019 | Hall | B60W 50/14 |
| 10,571,023 | B2 | 2/2020 | Neelakantan et al. | |
| 10,987,987 | B2 * | 4/2021 | Graus | B60G 17/0165 |
| 11,904,648 | B2 * | 2/2024 | Graus | B60G 15/06 |
| 2004/0017286 | A1 * | 1/2004 | Takeda | B62M 25/04 340/432 |
| 2004/0106498 | A1 * | 6/2004 | Badillo | B60W 10/02 477/109 |
| 2006/0001315 | A1 * | 1/2006 | Stevens | B60G 15/063 303/191 |
| 2007/0281827 | A1 | 12/2007 | Shimizu et al. | |
| 2012/0078477 | A1 * | 3/2012 | Takashiro | F16H 59/08 701/52 |
| 2012/0096979 | A1 * | 4/2012 | Trujillo Linke | B60K 35/60 74/552 |
| 2012/0221200 | A1 * | 8/2012 | Golomb | B60Q 1/0082 701/1 |
| 2013/0087003 | A1 * | 4/2013 | Dylla | F16H 61/0437 74/473.1 |
| 2013/0151074 | A1 * | 6/2013 | Takeuchi | B60W 10/04 701/41 |
| 2013/0197731 | A1 | 8/2013 | Schum et al. | |
| 2013/0314503 | A1 * | 11/2013 | Nix | G06V 20/58 348/46 |
| 2014/0116178 | A1 * | 5/2014 | Sata | F16H 61/0213 74/473.31 |
| 2014/0125018 | A1 * | 5/2014 | Brady | B60G 17/016 280/5.519 |
| 2016/0042644 | A1 * | 2/2016 | Velusamy | G08G 1/096775 340/435 |
| 2017/0087950 | A1 * | 3/2017 | Brady | B60G 17/016 |
| 2017/0158191 | A1 * | 6/2017 | Bills | B60W 30/025 |
| 2017/0203760 | A1 * | 7/2017 | Sowards | B60W 10/184 |
| 2018/0156330 | A1 * | 6/2018 | Wang | F16H 63/46 |
| 2018/0346116 | A1 * | 12/2018 | Kundu | B60W 40/06 |
| 2018/0354336 | A1 * | 12/2018 | Oakden-Graus | B60G 17/016 |
| 2020/0032902 | A1 | 1/2020 | Neelakantan et al. | |
| 2020/0156430 | A1 * | 5/2020 | Oakden-Graus | B60G 17/0165 |
| 2020/0189593 | A1 * | 6/2020 | Wishin | B60W 10/11 |
| 2021/0162833 | A1 * | 6/2021 | Graus | B60G 17/016 |
| 2022/0016949 | A1 * | 1/2022 | Graus | B60G 15/06 |
| 2022/0105939 | A1 * | 4/2022 | Barber | B60W 30/18009 |

FOREIGN PATENT DOCUMENTS

| | | | | | |
|---|---|---|---|---|---|
| CN | 114313004 | A | | 4/2022 | |
| DE | 102019220398 | A1 | | 6/2020 | |
| EP | 1967434 | A1 | | 9/2008 | |
| JP | 2003327101 | A | | 11/2003 | |
| JP | 2009078713 | A | * | 4/2009 | B60W 10/06 |
| JP | 2019147445 | A | | 9/2019 | |
| KR | 20160099429 | A | * | 8/2016 | B60G 17/0162 |

* cited by examiner

SUSPENSION SYSTEM WITH ON-DEMAND FULL DAMPER CAPACITY

TECHNICAL FIELD

Example embodiments generally relate to vehicle suspension and, more particularly, relate to a suspension system that is capable of providing full damping on-demand when an operator recognizes such a need and reacts to the same in real time.

BACKGROUND

Vehicles commonly employ a solid axle or an independent suspension that allows each wheel to move relative to the vehicle chassis independent of the other wheels. The components and geometries used for these suspension designs can vary to some degree. Within some suspension systems, shock absorbers (or simply "shocks") are provided, which are designed to provide damping for pitch (i.e., oscillation about a lateral axis of the vehicle). The shocks generally resist compression and rebound with damping forces that are applied over a range of travel of a piston rod.

Once a typical vehicle is designed and the damping components have been selected, the components operate to provide the damping for which they are designed. Although some suspension systems are designed to be adjustable in relation to the amount of damping that is provided by the shocks, adjustments are typically made in advance, and based on driving conditions that are expected to be encountered. However, some situations may be encountered in which the ability to maximize damping resistance instantaneously would be helpful.

BRIEF SUMMARY OF SOME EXAMPLES

In accordance with an example embodiment, a suspension control system for a vehicle may be provided. The vehicle control system may include a plurality of adjustable dampers associated with suspension of respective ones of a plurality of wheels of the vehicle, a controller operably coupled to the adjustable dampers to selectively adjust a damping force of one or more of the adjustable dampers responsive to an activation signal, and a driver interface disposed at a steering wheel assembly of the vehicle. The driver interface may be actuated by a driver of the vehicle to apply the activation signal while the driver interface is actuated.

In another example embodiment, a method of applying damping force adjustment for a suspension system of a vehicle may be provided. The method may include receiving a trigger event from a multiple function driver interface of the vehicle, generating an activation signal responsive to the trigger event for communication to a plurality of adjustable dampers associated with suspension of respective ones of a plurality of wheels of the vehicle, and adjusting adjust a damping force of one or more of the adjustable dampers responsive to the activation signal while the driver interface is actuated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
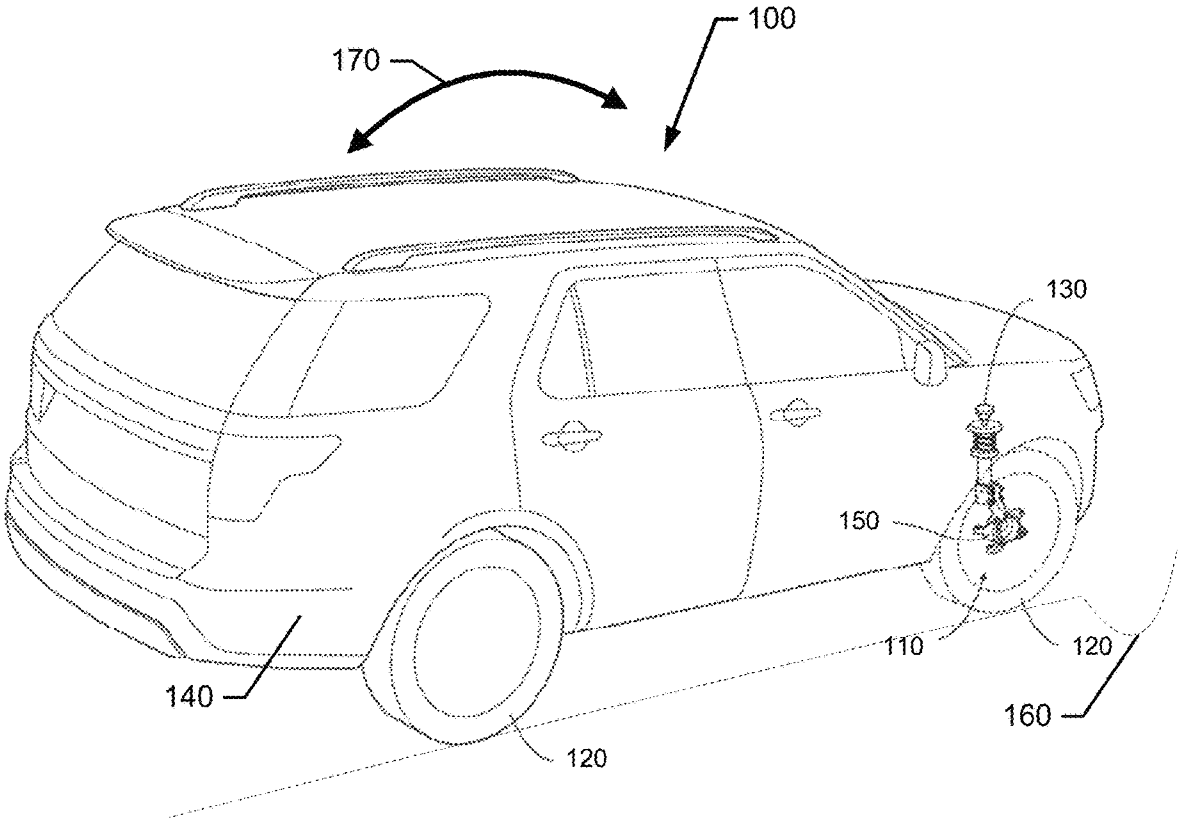
FIG. 1 illustrates a perspective view of a vehicle encountering an obstacle and certain components of a suspension system of the vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

When operating under normal steady state conditions, even suspension systems that can be adjusted will normally not undergo any such adjustments. However, if a pothole or object is encountered, which cannot be avoided, the operator may wish to be able to respond to such encounter as soon as the situation is identified. Example embodiments enable the operator to immediately initiate a maximum level of damping to the suspension system. Moreover, given that the response time of the operator will inherently be a limiting factor in initiating immediate changes to the suspension system, it may be further desirable to place the means by which the operator initiates the changes in as convenient a location as possible.

Example embodiments may provide actuators integrated into the steering wheel assembly and proximate to where the hands of the operator are normally located on the steering wheel. Moreover, some example embodiments may utilize already existing actuators that are conveniently located proximate to where the hands of the operator are normally located on the steering wheel, and provide a second purpose or utilization for the actuators. For example, transmission paddles or actuators that are normally provided at the steering wheel assembly and used to provide manual gear shifting either up or down may be used, when actuated simultaneously, to provide maximum damping (e.g., maximum compression or rebound damping). The operator may therefore not need to take any time to reposition the hands, but instead readily be poised to initiate desired changes as soon as the need for any change is detected.

FIG. 1 illustrates a perspective of a vehicle 100 employing a suspension system 110 of an example embodiment. The suspension system 110 includes a plurality of wheels 120 in contact with the ground, and a damper 130 (e.g., a shock absorber or shock) disposed between each one of the wheels 120 and a body 140 or chassis of the vehicle 100. In some cases, the wheel 120 may be operably coupled to the damper 130 via a steering knuckle 150. Additional links may also be provided between the chassis and the steering knuckle 150 to stabilize the wheel 120, but such links are outside the scope of example embodiments.

As shown in FIG. 1, a pothole 160, as one example of an object that may advantageously traversed with maximum damping, may be encountered by the vehicle 100. The vehicle 100 may have otherwise and previously been operating steady state over relatively smooth terrain, and the pothole 160 may only be visible when avoidance is not possible, and the pothole 160 (or other object) simply must be traversed. Notably, although the pothole 160 shown as a depression in the otherwise smooth surface (e.g., road) being traversed, it is also possible for an object extending out of the surface (e.g., a rock, boulder, etc.) to be traversed with assistance from example embodiments. The body 140 of the vehicle 100 may tend to move up and down pitching as shown by double arrow 170 as the pothole 160 is traversed. The pitching may correspondingly cause compression and extension of the damper 130 of the suspension system 110, as the damper 130 attempts to dampen out the motion. Because the damper 130 necessarily has a limited amount of linear travel for the piston rod therein, a certain degree of harshness could be encountered when the limit is reached at either end. To reduce this harshness, and provide a smoother ride for passengers, the damper 130 may provide additional damping force (e.g., additional hydraulic force) which, in example embodiments, may be provided by manual initiation of actuators by the driver upon the driver noticing the pothole 160. The provision of the additional damping force may therefore be controlled responsive to detection of specific conditions that correspond to impending travel over an obstacle or object for which a quick reactive change to the damping force is desirable.

Figure 2:
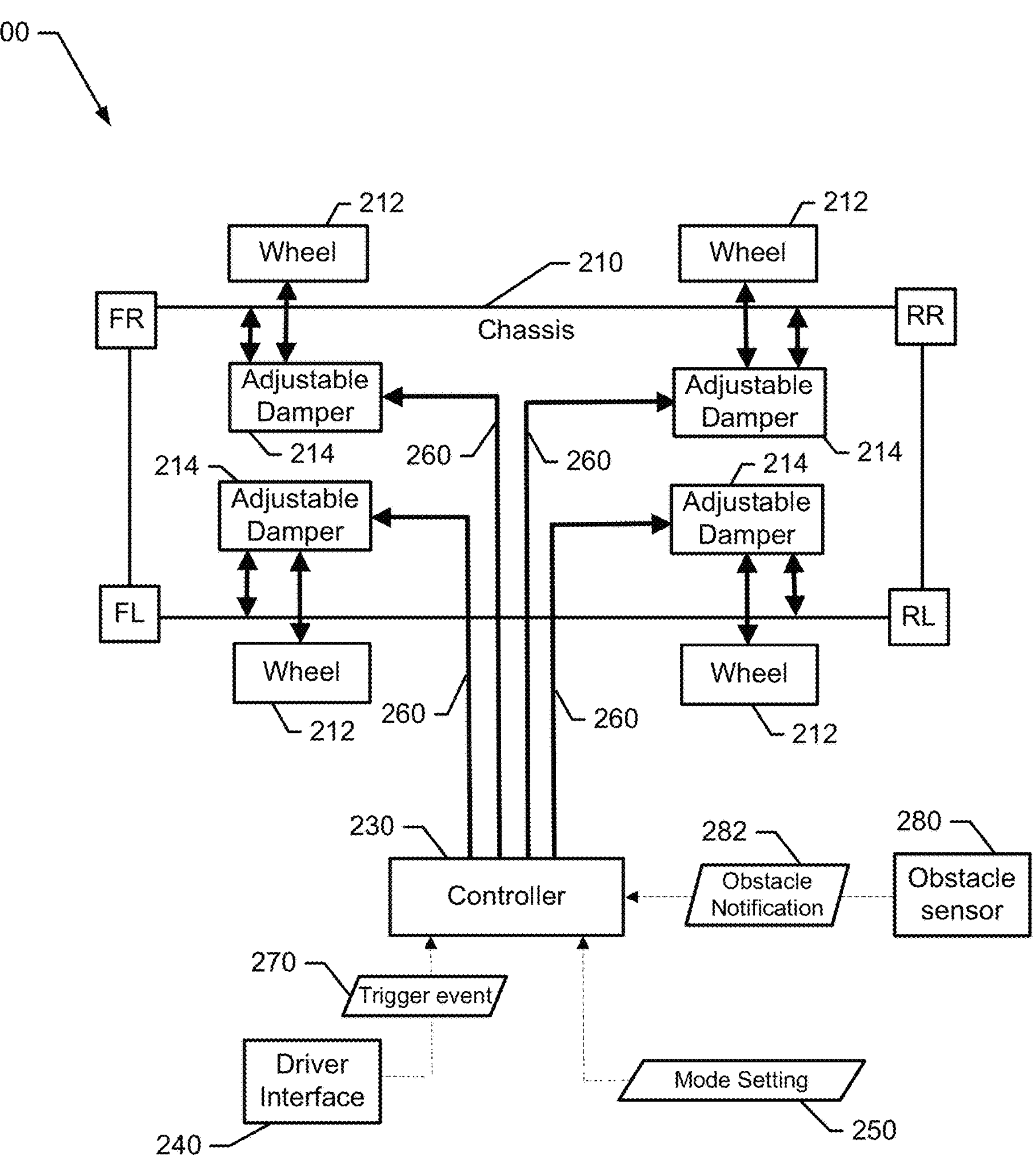
FIG. 2 illustrates a block diagram of a suspension control system in accordance with an example embodiment.

Thus, to improve suspension performance, example embodiments may employ a suspension control system 200 that enables the quick reaction response noted above. The suspension control system 200 may improve suspension performance by providing easy access actuators that can be manually actuated by the driver. An example is shown in FIG. 2, which illustrates a block diagram of the suspension control system 200. As shown in FIG. 2, a vehicle chassis 210 may be provided with wheels 212. The wheels 212, and corresponding instances of an adjustable damper 214 for each respective one of the wheels 212 may form part of a suspension system of the vehicle on which the suspension control system 200 is deployed.

In an example embodiment, the suspension control system 200 may include a wheel 212 and each respective adjustable damper 214 in or near each corner of the chassis 210 (e.g., front-right (FR), front-left (FL), rear-right (RR) and rear-left (RL)). The adjustable dampers 214 may each be operably coupled to a controller 230, which may be an electronic control unit (ECU) of the vehicle, or a separate instance of processing circuitry comprising a processor and memory. The controller 230 may be configured (e.g., via hardware, software or a combination of hardware and software configuration or programming) to receive a driver input from a driver interface 240, and apply a damping adjustments by adjusting each of the adjustable dampers 214 to a maximum damping setting when the driver input is received as described in greater detail below. In some cases, a mode setting 250 may be provided to the controller 230, and the operability of the adjustable dampers 214 to the maximum damping setting responsive to actuation of the driver interface 240 may only be enabled when the mode setting 250 is in a corresponding mode for which such operation is programmed or otherwise permitted.

Thus, for example, the controller 230 may also be operably coupled to a user interface (e.g., the driver interface 240). In an example embodiment, the controller 230 may be configured to generate damping intervention signals 260 to change the damping characteristics of the adjustable dampers 214 to a maximum level (or other calibrated level that may be desired) based on actuation of actuators at the driver interface 240 that indicate the intention of the driver to initiate such change the damping characteristics. The damping intervention signals 260 may be communicated over a vehicle communication bus (e.g., a controller area network (CAN) bus), and may be generated by a vehicle dynamics module (VDM) or other module programmed to interface with the adjustable dampers 214 as described herein. In such an example, instead of being four separate signals (as shown in the example of FIG. 2), the damping intervention signals 260 may effectively be combined into a single activation signal that is sent via the CAN bus to all of the adjustable dampers 214.

Although not required, in some examples, the interventions generated by the controller 230 may be generated in a particular, driver-selected operational mode. Thus, for example, the driver interface 240 may also be used by the driver to enter a mode in which the controller 230 is enabled to generate the damping intervention signals 260 responsive to detection of the actuation of actuators that may also be a portion of the driver interface 240. In some cases, the driver interface 240 may be provided at the steering wheel, dashboard, center console, armrest and/or any other console or location conveniently accessible to the driver. The driver interface 240 may include one or more instances of a button, switch, lever, key (soft or hard) or other operable member that can be actuated to activate the controller 240 into the driver-selected operational mode in which damping intervention signals 260 are generated. When the driver-selected operational mode is activated, the controller 230 may be enabled to automatically monitor conditions to determine whether (and when) to apply the damping intervention signals 260 as described herein. The driver-selected operational mode may, in some cases, be an off-road driving mode. However, as an alternative, the controller 230 may be configured to generate the damping intervention signals 260 in multiple or even in every driving mode, while in still other cases, there may be no mode dependency at all. In other words, the controller 230 may be programmed to generate the damping intervention signals 260 when the driver interface 240 is actuated to demonstrate driver intent to do so without regard to any selectable mode in some cases.

In an example embodiment, the controller 230 may operate to generate the damping intervention signals 260 responsive to a specific trigger or initiating event. Although many different triggers or initiating events could activate the controller 230 to cause the damping intervention signals 260 to be generated, some example embodiments may provide that the trigger or initiating event is receipt of an unambiguous trigger event 270 indicating a desire and intent of the driver to generate the damping intervention signals 260.

Although the activation signal generation of example embodiments may be manual, an automatic notification of the possibility that the driver may wish to utilize the manual option to adjust damping force may be integrated in some cases. As an example, the suspension control system 200 may further include an obstacle sensor (or detector) 280 in some embodiments. The obstacle sensor 280 may be a LIDAR detector, a camera, or any other sensor capable of examining an area in front of the vehicle 100 to determine the presence of an obstacle. If such presence is detected (or the possibility of such presence is detected), the obstacle sensor 280 may issue an obstacle notification 282 to the driver. The obstacle notification 282 may be a vibration, symbol, light, sound or other visual, audible or haptic notification to inform the driver to be aware of the possibility of an obstacle being encountered. The obstacle notification 282 may therefore not be the trigger event for adjusting damping force, but may make the driver aware that readiness to encounter an obstacle is advisable. In some cases, the operation of the obstacle sensor 280 may be selectable or optional based on a mode of operation selected by the driver.

Figure 3:
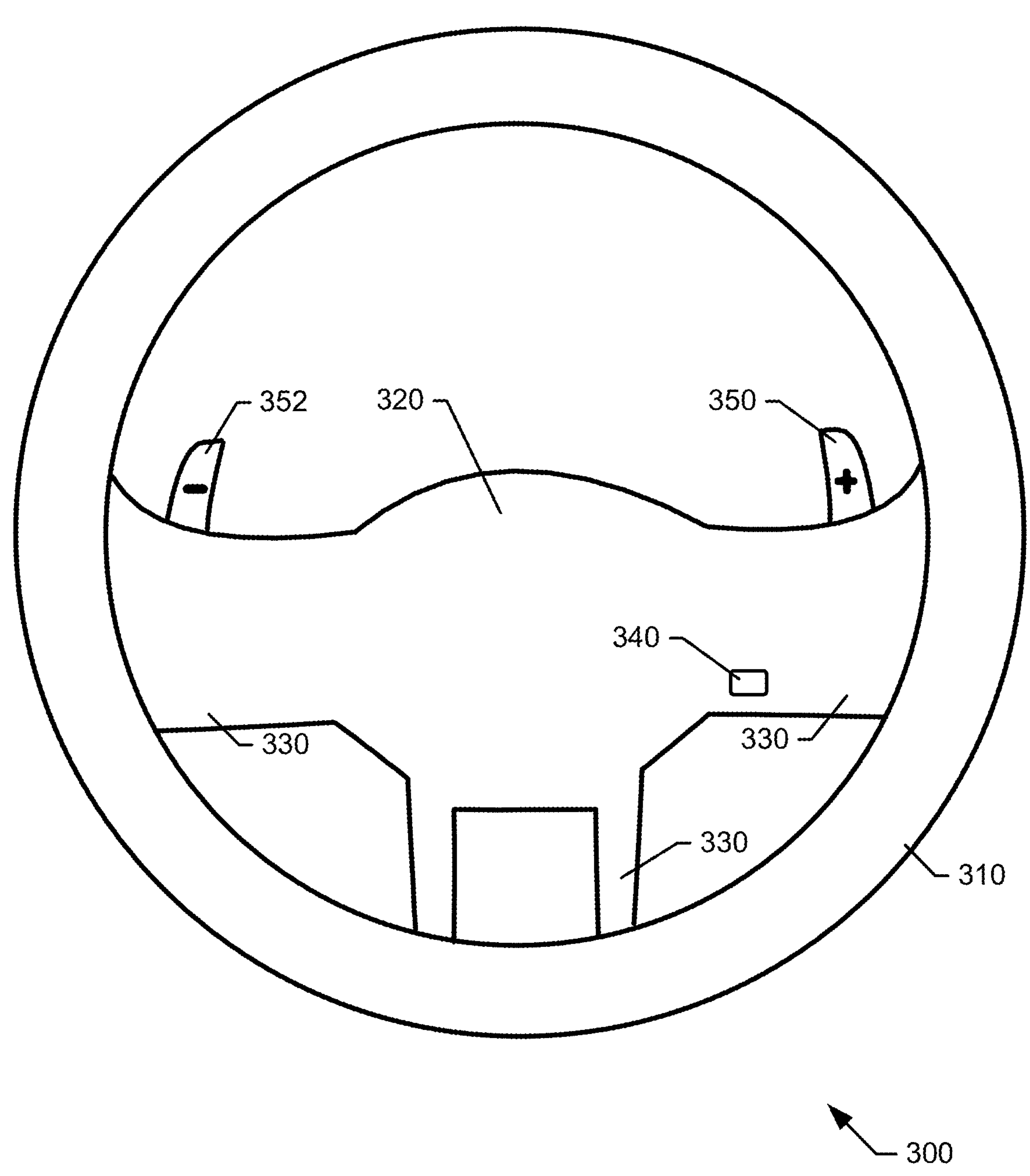
FIG. 3 illustrates a steering wheel assembly in accordance with an example embodiment.

As mentioned above, in order to reduce the reaction time of the driver relative to providing the trigger event 270, it may be desirable to employ portions of the driver interface 240 that are most easily accessible while driving. FIG. 3 illustrates one example physical embodiment of the driver interface 240 that could prove useful in this regard.

Referring now to FIG. 3, a portion of a steering wheel assembly 300 is shown schematically. The steering wheel assembly 300 includes a handwheel 310, a hub portion 320 and one or more spoke portions 330 that operably couple the handwheel 310 to the hub portion 320. Although the spoke portions 330 need not necessarily perform any function beyond coupling the hub portion 320 to the handwheel 310, it is often the case that the spoke portions 330 provide a convenient location to provide buttons, actuators, and/or the like that may form portions of the driver interface 240. In this regard, drivers are generally taught to place their hands at the 10 o'clock and 2 o'clock position on the handwheel 310 during driving. Thus, the drivers fingers can access the buttons, actuators, etc., on the spoke portions 330 in some cases without being removed from the handwheel 310.

FIG. 3 illustrates one example of a button 340 that may be located at one of the spoke portions 330. However, it should be appreciated that no buttons, or in some cases, many more buttons may alternatively or also be provided on the spoke portions 330. In this example, the button 340 may be a mode selector that is usable to change a driving mode of the vehicle 100. As such, the button 340 may be selectable to enter the mode setting 250 described above in connection with FIG. 2.

FIG. 3 also shows a first actuator 350, which is located on the spoke portion 330 that is proximate to the 2 o'clock position on the handwheel 310, and a second actuator 352, which is located on the spoke portion 330 that is proximate to the 10 o'clock position on the handwheel 310. In normal situations, in certain modes, or in some cases in all modes, the first and second actuators 350 and 352 may be transmission paddles that are operable to shift up and shift down the transmission when actuated by the driver. Thus, for example, while driving with hands at the 2 o'clock and 10 o'clock positions, the driver can actuate or operate (e.g., by push or pull) a selected one of the first and second actuators 350 and 352, respectively, to shift the transmission of the vehicle 100 in the corresponding way (i.e., up or down).

Example embodiments may add an additional functionality to the first and second actuators 350 and 352 when the first and second actuators 350 and 352 are actuated simultaneously (e.g., being pushed together or pulled together). The additional functionality may, in some cases, only be provided when the mode setting 250 defines a mode in which such functionality is supported. However, the additional functionality need not necessarily be mode dependent. In either case, as with individual actuation of the first and second actuators 350 and 352, while driving with hands at the 2 o'clock and 10 o'clock positions, the driver can actuate or operate (e.g., by push or pull) both of the first and second actuators 350 and 352 simultaneously to provide a different signal of driver intent in the form of the trigger event 270 discussed above.

In an example embodiment, the driver may notice an obstacle (e.g., the pothole 160) in the path ahead, and may simultaneously pull both the first and second actuators 350 and 352 toward the driver (e.g., by pushing the first and second actuators 350 and 352 from behind with the index and/or middle fingers of each hand). As seen from the reference point of the viewer of FIG. 3, which is the same reference point the driver would have, the first and second actuators 350 and 352 may be seen to move toward the driver (i.e., out of the page and toward the viewer). This movement (i.e., a double pull of the first and second actuators 350 and 352) may be the trigger event 270 that causes generation of the damping intervention signals 260 by the controller 230. However, a double push or movement in the opposite direction may be used to generate the damping intervention signals 260 in alternative embodiments.

In an example embodiment, receipt of the damping intervention signals 260 may cause each of the adjustable dampers 214 to simultaneously adjust damping force in the adjustable dampers 214 to a predetermined force setpoint. In some embodiments, the predetermined force setpoint may be a maximum setting such that maximum damping is provided only for as long as both the first and second actuators 350 and 352 are simultaneously actuated. As soon as one of the first or second actuators 350 or 352 is released, the damping intervention signals 260 may all be interrupted or stopped. However, in some embodiments, the actuation of the first and second actuators 350 and 352 may initiate a minimum dwell time during which the damping intervention signals 260 are generated even if the first actuator 350 or the second actuator 352 has been released.

In some embodiments, it may also be possible to delay the application of the adjustment to rear wheels relative to the adjustment made to front wheels (for both initiation of the change, and return to normal damping settings upon release). In such cases, the vehicle speed may be used to delay application to the rear wheels based on the length of time it will take at the vehicle speed for the rear wheels to reach the same object or obstruction that is about to be encountered by the front wheels. The delay may also or alternatively account for the time it may take for the front wheels to encounter the obstacle, which may again be based on speed. However, merely conducting all changes simultaneously may be employed as a more simple embodiment in some cases.

Figure 4:
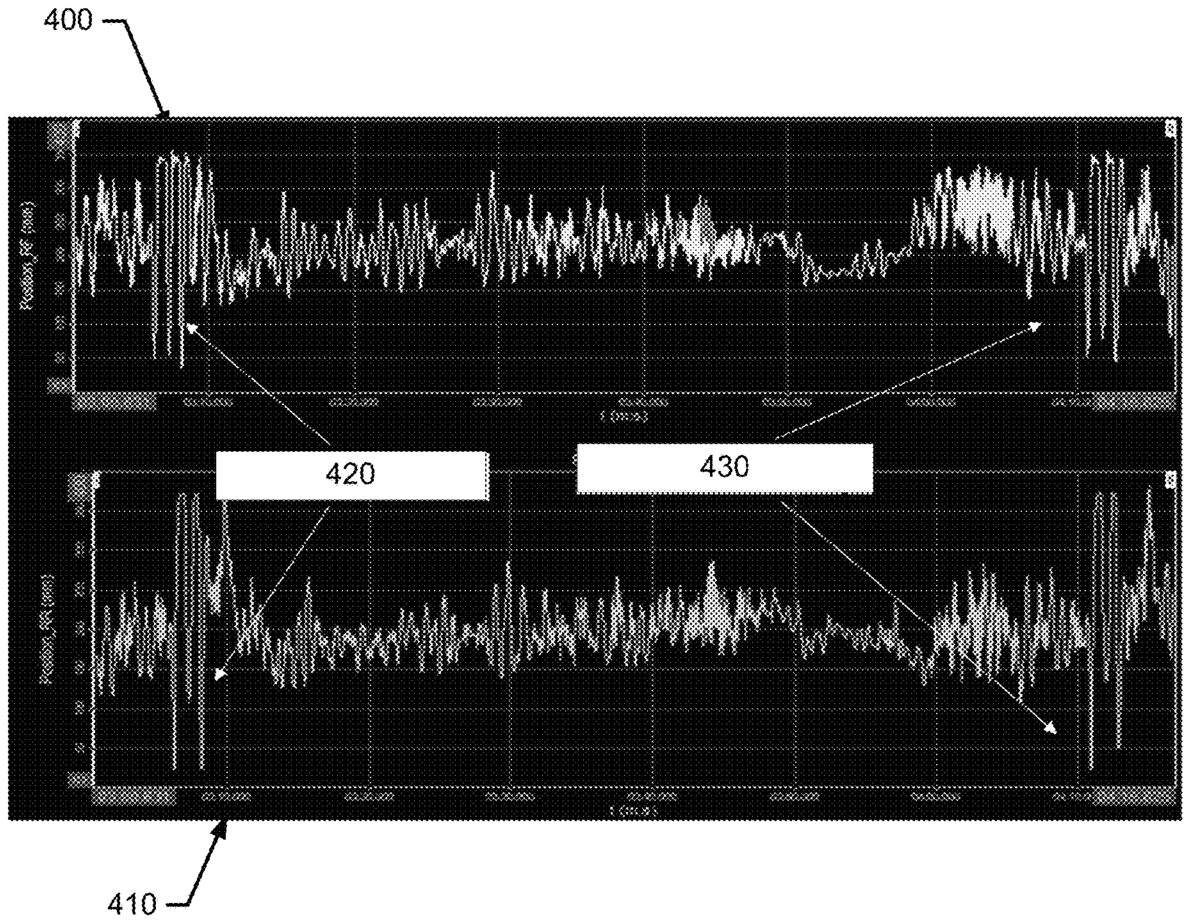
FIG. 4 illustrates a plot of wheel position versus time for front and rear wheels in accordance with an example embodiment.

The use of manual damping force adjustment in an on-demand and manually actuated context as described herein may be practiced as an alternative to the operation of automatic control algorithms that can adjust the damping forces, or as an augmentation to the same. FIG. 4 illustrates two plots of wheel position. In this regard, top plot 400 is of wheel position vs time for the right front wheel of a vehicle, and bottom plot 410 is of wheel position vs time for the right rear wheel of the vehicle. On the left side of both the top plot 400 and bottom plot 410, as shown particularly at point 420, an active suspension algorithm runs to change damping force applied and the resulting performance can be judged based on wheel position changes shown. Meanwhile, on the right side of both the top plot 400 and bottom plot 410, as shown particularly at point 430, manual (driver inserted)

damping force changes in association with an example embodiment are applied and the resulting performance can be judged based on wheel position changes shown. In comparing the performance of the active suspension algorithm to example embodiments, it can be appreciated from the plots that ramp up compression is 5.5 mm better for the front wheel, and 9 mm better for the rear wheel. Table top compression is 28.5 mm better for the front wheel, and 32 mm better for the rear wheel. Meanwhile, landing zone compression is 5.5 mm better for the front wheel, and 24.5 mm better for the rear wheel. Example embodiments therefore cause the vehicle to take less force and may provide, for example, about 0.5 to 1 g better Az compression and 0.25 g better Az rebound performance. In this regard, example embodiments provide reduced suspension travel, and are therefore more efficient at absorbing energy.

Figure 5:
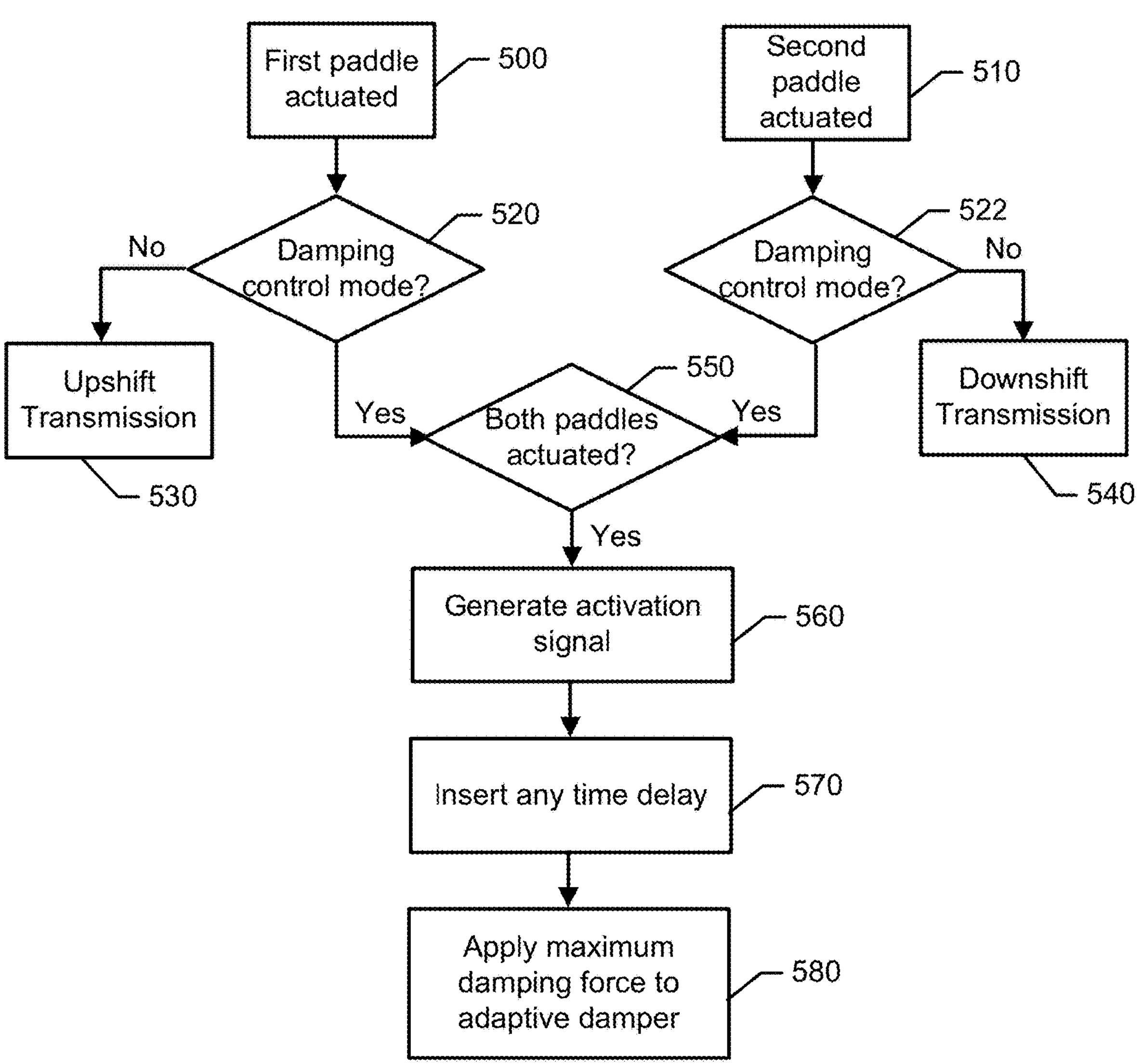
FIG. 5 illustrates a control flow diagram showing suspension control in accordance with an example embodiment.

FIG. 5 illustrates a control flow diagram for how the controller 230 may operate to implement an example embodiment in some cases. In this regard, as shown in FIG. 5, control flow may begin when a first paddle (e.g., a shift up paddle) is actuated at operation 500, or a second paddle (e.g., a shift down paddle) is actuated at operation 510. If either is actuated, a determination may be made at operation 520 and 522, respectively, as to whether a current operational mode is a damping control mode (i.e., a mode in which damping control as described above is enabled). If the first paddle has been actuated, and damping control mode is not selected, then the transmission may be upshifted (assuming other preconditions for such shifting are also met) at operation at operation 530. If the second paddle has been actuated, and damping control mode is not selected, then the transmission may be downshifted (assuming other preconditions for such shifting are also met) at operation 540. If damping control mode is selected, then a further determination may be made as to whether both the first and second paddles are actuated at the same time at operation 550. If both paddles are actuated at the same time, then the activation signal may be generated at operation 560. A time delay may be inserted at operation 570 based on vehicle speed, and then an adjustment may be made to maximize damping force in each of the adaptive dampers at operation 580.

Figure 6:
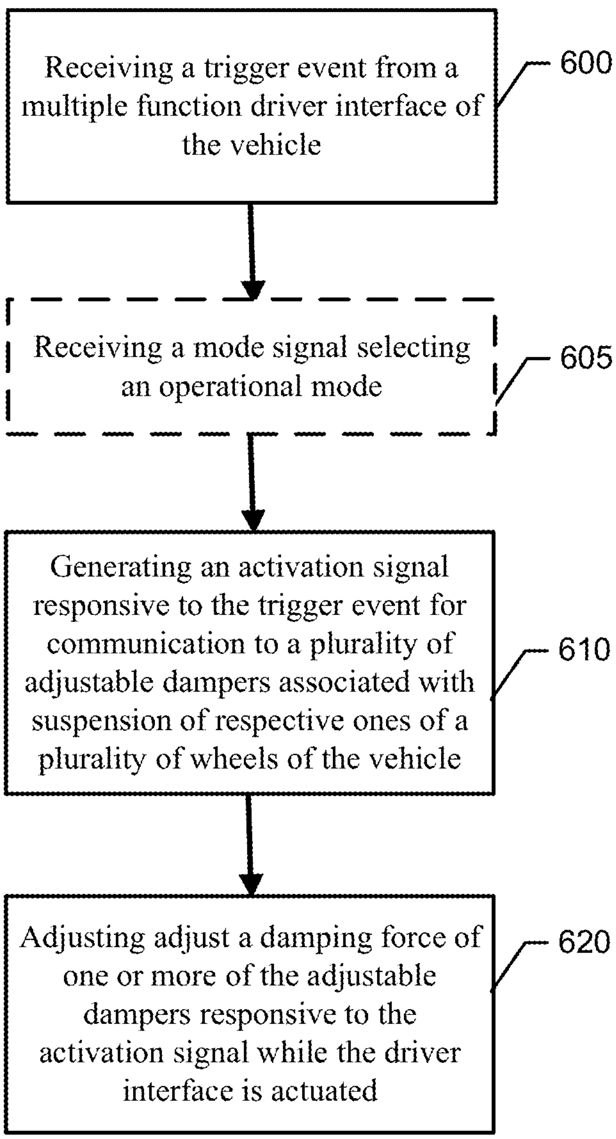
FIG. 6 is a block diagram of a method of improving vehicle suspension according to an example embodiment.

In an example embodiment, a method of applying damping force adjustment for a suspension system of a vehicle may be provided. An example of such a method is shown in the block diagram of FIG. 6. In this regard, the method. The method may include receiving a trigger event from a multiple function driver interface of the vehicle at operation 600, generating an activation signal responsive to the trigger event for communication to a plurality of adjustable dampers associated with suspension of respective ones of a plurality of wheels of the vehicle at operation 610, and adjusting adjust a damping force of one or more of the adjustable dampers responsive to the activation signal while the driver interface is actuated at operation 620.

The method of some embodiments may include additional steps, modifications, augmentations and/or the like to achieve further objectives or enhance performance of the method. The additional steps, modifications, augmentations and/or the like may be added in any combination with each other. Below is a list of various additional steps, modifications, and augmentations that can each be added individually or in any combination with each other. For example, adjusting the damping force of the one or more of the adjustable dampers may include simultaneously adjusting all of the adjustable dampers to a maximum damping setting. In an example embodiment, the driver interface may include a first actuator disposed at a first spoke portion of the steering wheel assembly, and a second actuator disposed at a second spoke portion of the steering wheel assembly. The activation signal may be generated only while both the first and second actuators are simultaneously actuated. In some cases, a primary function of the first and second actuators may be shifting a transmission of the vehicle responsive to individual actuation of the first or second actuators, and generating the activation signal may be performed as a secondary function responsive to actuation of both the first and second actuators. In an example embodiment, the method may further include optional operation 605 of receiving a mode signal selecting an operational mode. When mode signals are received, generating the activation signal may be enabled in a first mode, and the first and second actuators may shift the transmission of the vehicle in a second mode. In an example embodiment, a time delay may be inserted between generating the activation signal and adjusting the damping force, and the time delay may be mode dependent or vehicle speed dependent.

Example embodiments may provide improved suspension performance while driving in any environment in which an unanticipated obstacle may present itself in the path of a vehicle. Example embodiments may be practiced in connection with adjustable (and even automatically adjustable) suspension systems. Automatically adjustable suspension systems may rely on algorithms (which may be mode dependent) to make certain adjustments thereto. However, certain events cannot be anticipated by algorithms, and cannot be effectively addressed by such algorithms, and that is where the ability of the driver to manually maximize damping force instantaneously may be of great utility. Driving enthusiasts and off-road vehicle drivers may greatly appreciate the manual control and vehicle interaction aspects of example embodiments, given the ability of the driver to manually settle the vehicle after large events using what is effectively a quickly applied damping force. Thus, example embodiments may provide an improved suspension control system for a vehicle. The system may include a plurality of adjustable dampers associated with suspension of respective ones of a plurality of wheels of the vehicle, a controller operably coupled to the adjustable dampers to selectively adjust a damping force of one or more of the adjustable dampers responsive to an activation signal, and a driver interface disposed at a steering wheel assembly of the vehicle. The driver interface may be actuated by a driver of the vehicle to apply the activation signal while the driver interface is actuated.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, selectively adjusting the damping force of the one or more of the adjustable dampers may include simultaneously adjusting all of the adjustable dampers to a maximum damping setting. In an example embodiment, the driver interface may include a first actuator disposed at a first spoke portion of the steering wheel assembly, and a second actuator disposed at a second spoke portion of the steering wheel assembly. In some cases, the first actuator may be disposed proximate to a 2 o'clock position of a handwheel of the steering wheel assembly, and the second actuator may be disposed proximate to a 10 o'clock position of the handwheel. In an example embodiment, the activation signal may be applied only while both the first and second actuators are simultaneously actuated. In some cases, the activation signal may be applied for at least a minimum dwell time responsive to both the first and second actuators being simultaneously actuated. In an example embodiment, the first and second actuators may each have a different primary function from applying the activation signal when either of the first and second actuators is actuated individually. In some cases, the different primary function of the first and second actuators may be shifting a transmission of the vehicle. In an example embodiment, the controller may receive a mode signal selecting an operational mode, and applying the activation signal may be enabled in a first mode, and the first and second actuators may perform the different primary function in a second mode. In some cases, the first mode may be an off-road driving mode. In an example embodiment, the controller may be operably coupled to an obstacle detector, and an obstacle notification may be provided to the driver responsive to the obstacle detector detecting presence of an obstacle in a path of the vehicle. In some cases, the driver interface may be embodied as a multiple function actuator for which applying the activation signal is one of the multiple functions and shifting a transmission of the vehicle is another of the multiple functions. In an example embodiment, a time delay may be inserted between provision of the activation signal and adjusting the damping force of one or more of the adjustable dampers. In some cases, the time delay may be mode dependent or vehicle speed dependent.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A suspension control system for a vehicle, the system comprising:

a plurality of adjustable dampers associated with suspension of respective ones of a plurality of wheels of the vehicle;

a controller operably coupled to the adjustable dampers to selectively adjust a damping force of one or more of the adjustable dampers responsive to an activation signal; and a multi-purpose driver interface disposed at a steering wheel assembly of the vehicle, the multi-purpose driver interface being actuated by a driver of the vehicle to apply the activation signal while the driver interface is actuated, wherein the multi-purpose driver interface has a different primary function from applying the activation signal related to a different vehicle subsystem in a first mode, and wherein selectively adjusting the damping force of the one or more of the adjustable dampers is performed as a real time adjustment responsive to the multi-purpose driver interface being actuated during a suspension event in a second mode.

2. The system of claim 1, wherein selectively adjusting the damping force of the one or more of the adjustable dampers comprises simultaneously adjusting all of the adjustable dampers to a maximum damping setting.

3. The system of claim 1, wherein the multi-purpose driver interface comprises a first actuator disposed at a first portion of the steering wheel assembly, and a second actuator disposed at a second portion of the steering wheel assembly.

4. The system of claim 3, wherein the first actuator is disposed proximate to a 2 o'clock position of a handwheel of the steering wheel assembly, and wherein the second actuator is disposed proximate to a 10 o'clock position of the handwheel.

5. The system of claim 3, wherein the activation signal is applied only while both the first and second actuators are simultaneously actuated.

6. The system of claim 1, wherein the activation signal is applied for at least a minimum dwell time responsive to the multi-purpose driver interface being actuated.

7. The system of claim 1, wherein the different primary function of the multi-purpose driver interface comprises shifting a transmission of the vehicle in the first mode.

8. The system of claim 1, wherein the controller receives a mode signal selecting an operational mode among the first mode and the second mode responsive to operation of a mode selector.

9. The system of claim 8, wherein the mode selector is a button.

10. The system of claim 8, wherein the second mode is an off-road driving mode.

11. The system of claim 1, wherein the controller is operably coupled to an obstacle detector, and wherein an obstacle notification is provided to the driver responsive to the obstacle detector detecting presence of an obstacle in a path of the vehicle.

12. The system of claim 1, wherein the multi-purpose driver interface comprises a multiple function actuator for which applying the activation signal is one of the multiple functions and shifting a transmission of the vehicle is another of the multiple functions.

13. The system of claim 1, wherein a time delay is inserted between provision of the activation signal and adjusting the damping force of one or more of the adjustable dampers.

14. The system of claim 13, wherein the time delay is mode dependent or vehicle speed dependent.

15. A suspension control system for a vehicle, the system comprising:

a plurality of adjustable dampers associated with suspension of respective ones of a plurality of wheels of the vehicle;

a controller operably coupled to the adjustable dampers to selectively adjust a damping force of one or more of the adjustable dampers responsive to an activation signal; and a driver interface disposed proximate to a steering wheel assembly of the vehicle, the driver interface being actuated by a driver of the vehicle to apply the activation signal while the driver interface is actuated, wherein a first mode or a second mode is selected, and wherein responsive to being in the first mode, the activation signal is applied to individual ones of the adjustable dampers, and responsive to being in the second mode, the activation is applied to all of the adjustable dampers simultaneously responsive to the actuation of the driver interface during a suspension event.

16. The system of claim 15, wherein selectively adjusting the damping force of the one or more of the adjustable dampers comprises simultaneously adjusting all of the adjustable dampers to a maximum damping setting.

17. The system of claim 15, wherein the activation signal is applied for at least a minimum dwell time responsive to the multi-purpose driver interface being actuated.

18. The system of claim 15, wherein the controller receives a mode signal selecting an operational mode among the first mode and the second mode responsive to operation of a mode selector, and wherein the mode selector is a button.

19. The system of claim 15, wherein the second mode is an off-road driving mode.

20. The system of claim 15, wherein the controller is operably coupled to an obstacle detector, and wherein an obstacle notification is provided to the driver responsive to the obstacle detector detecting presence of an obstacle in a path of the vehicle.

* * * * *